V. E. EDWARDS.
SHEARING MECHANISM.
APPLICATION FILED AUG. 22, 1916.

1,304,034.

Patented May 20, 1919.

Inventor
Victor E. Edwards.
By Geo. W. Kennedy Jr.
Attorney

UNITED STATES PATENT OFFICE.

VICTOR E. EDWARDS, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

SHEARING MECHANISM.

1,304,034.   Specification of Letters Patent.   Patented May 20, 1919.

Application filed August 22, 1916. Serial No. 116,397.

*To all whom it may concern:*

Be it known that I, VICTOR E. EDWARDS, a citizen of the United States, residing at Worcester, in the county of Worcester and Commonwealth of Massachusetts, have invented a new and useful Improvement in Shearing Mechanism, of which the following, together with the accompanying drawings, is a specification.

The present invention relates to a shearing mechanism, and more particularly, to mechanism of this class adapted for the cutting of metal into predetermined lengths, during the continuous advancement of the same.

The invention has for its object the improvement of the rotary type shear commonly employed for cutting continuously advancing material, by making a shear of this type of practically unlimited range, adapted to cut varying lengths from continuously advancing material, as determined by the operator.

The improvements reside in the introduction of a broadly new principle of operation, embodied in such a form as to impart to a rotary shear the essential characteristics of the so-called "gag" type of reciprocating shear; and in the novel combination and arrangement of parts employed to carry out this result.

One embodiment of my improved shear is illustrated in the accompanying drawings and described in the following specification, but it is to be understood that the construction thereof is susceptible of wide variation without departing from the spirit of the invention, as expressed in the annexed claims.

Referring to the accompanying drawings, Figure 1 is a top plan view of my improved shearing mechanism.

Similar reference characters refer to similar parts in the different figures.

Figure 1:
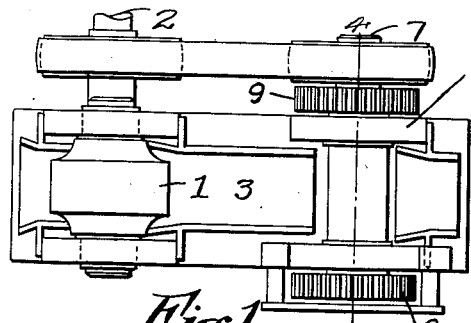
Figure 2:
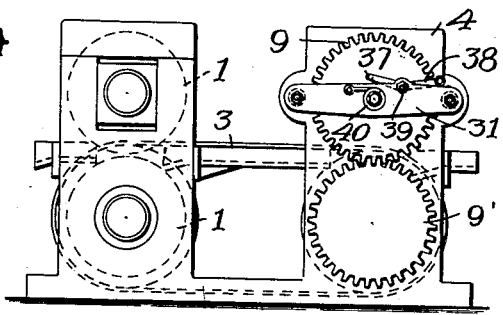
Fig. 2 is a side view thereof.

I have illustrated my shearing mechanism in connection with a stand of metal feeding rolls 1, 1, driven by a shaft 2 from any suitable source of power. The rolls 1, 1 advance the metal through the usual guide trough 3 to the shearing mechanism which is carried by a housing 4.

Said shearing mechanism, of the rotary type, comprises a pair of revolving shearing heads 5 and 6 having shafts 7 and 8, respectively, journaled in the housing 4. The shaft 8 of the lower head 6 is belt driven from the shaft 2, and intermeshing gears 9, 9' are provided on the shafts 7 and 8 of the two shearing heads to effect their rotation in unison.

The lower shearing head 6 is of ordinary construction, providing diametrically opposite substantially radial surfaces 10, 10 to which are secured, by means of bolts 11, 11, the knives 12, 12. The upper shearing head 5, instead of providing for the rigid attachment of its knives, to coöperate with the knives 12, 12 of the lower head 6, as in the usual devices of this class, is constructed so as to have its knives rendered selectively available, at desired times, for coöperation with the knives of the lower head, as hereinafter particularly set forth.

Figure 3:
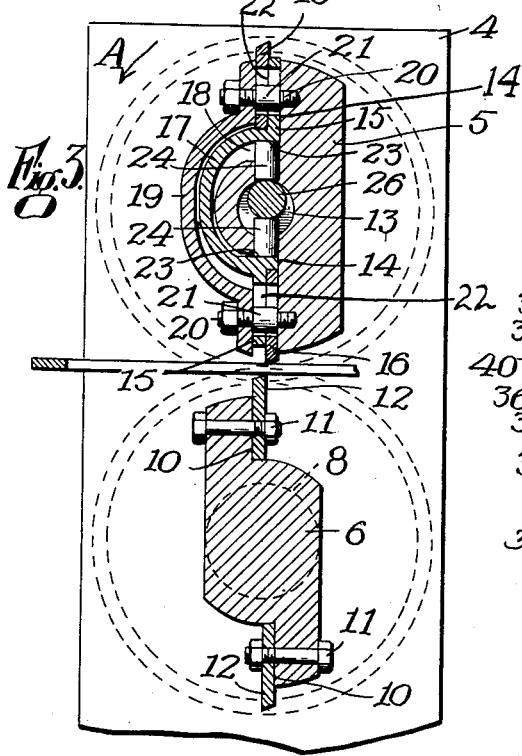
Fig. 3 is an enlarged sectional view of the coöperating shearing heads.

The shearing head 5 is preferably of the cross-sectional shape shown in Fig. 3, having an axial bore 13 therethrough which is open at each end through the shaft 7 and gears 9, the flat surfaces 14, 14 of said head being on the same side of the axis of said bore. A movable knife carrier 15 has attached thereto two diametrically opposite knives 16, 16, and is designed for radial sliding movement, with respect to the head 5, on the flattened surfaces 14, 14 provided by said head. To this end the knife carrier 15 is enlarged at its central portion, to provide room for a substantially semi-circular recess 17 which surrounds the wall of bore 13, sufficient clearance space 18 being provided to permit such sliding movement of the knife carrier, as hereinafter described. A plate 19 is bolted to the head 5, and covers said knife carrier, the bolts 20 having spacing collars 21 which define the thickness of the space occupied by said carrier, the latter, and the knives 16, 16 having elongated slots 22, 22 through which said spacing collars pass, whereby limited movement of the carrier and its knives is permitted.

Said carrier provides opposing surfaces 23, 23 on the concave side of enlargement 17, for coöperation with studs 24, 24 slidable in diametrically opposite radial openings 25, 25 in the head 5 which intersect the bore 13 at a number of points. The inner ends of each pair of studs bear against eccentrically reduced sections 26 of a shaft 27 which passes through and fits the bore 13 from end to end thereof. One end of said shaft is extended through one of the gears 9, said gear and the head 5 at this end being counterbored to provide an annular recess 28. About midway the length of the recess 28 the shaft is reduced in section outwardly to its end, from a shoulder 29, the portion of reduced section being surrounded by a sleeve 30 which abuts the shoulder 29. The sleeve 30 is attached to and preferably integral with a yoke 31, carried by the housing 4, and through this yoke the outer reduced end of shaft 27 projects.

Figure 5:
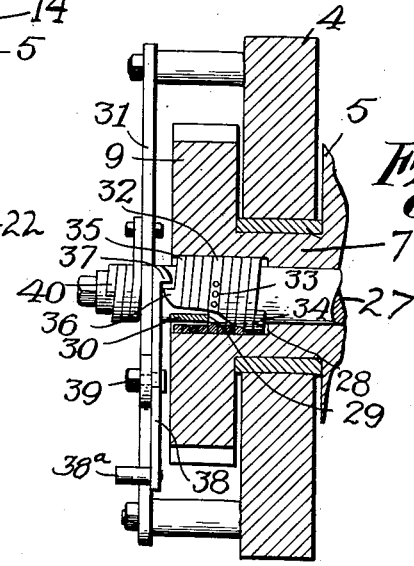
Fig. 5 is a fragmentary view of the same, shown in central longitudinal section taken at right angles to the section of Fig. 4.
Figure 4:
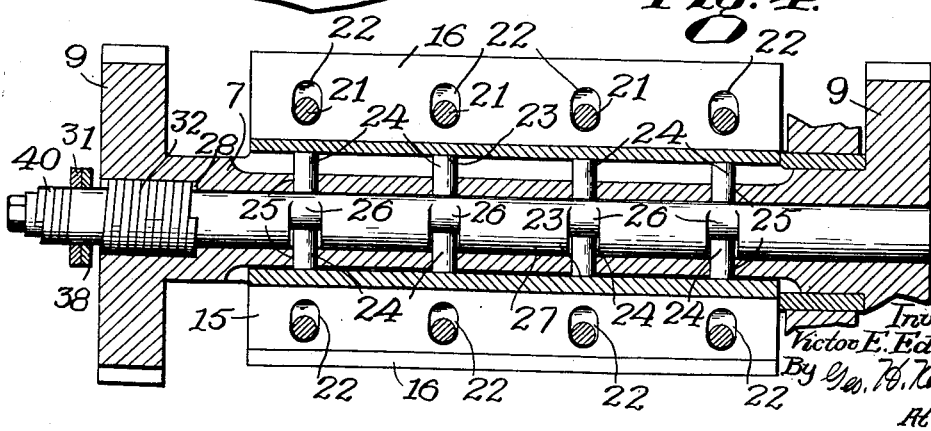
Fig. 4 is a central longitudinal sectional view of the upper shearing head on the plane of the broken line 4—4, Fig. 2, but on a larger scale.

The recess 28 of the gear and head provides a space around shaft 27 for a distance along its normal diameter, and such space also extends around the sleeve 30, as shown in Fig. 5. Within this space is disposed a coil 32, formed by a spirally wound band whose thickness is slightly less than the width of said space. Near its center, just inwardly of the shoulder 29, one convolution of said band is attached to the shaft 27, as at 33. In effect, this forms two coils 34 and 35, each attached at their adjacent ends to the shaft 27; the other end of coil 34 is free within the recess 28, and normally this coil by its expansive force bears against the wall of the recess and is free, except at 33, of the shaft 27. The free end of coil 35 has formed thereon a lug 36, with which a latch 37, on the end of a bar 38 pivoted at 39 to yoke 31, is adapted to coöperate. The bar 38 carries at its end opposite the latch 37 a pin 38ᵃ which projects over the yoke 31 serving as a handle to enable the operator to manually rock the bar 38 to engage or disengage the latch 37 and the lug 36, in order to render the cutting knives operative or inoperative as hereinafter explained. Another coil 40 has one end attached to the yoke 31, and surrounds the outer reduced end of shaft 27, beyond said yoke. Summarizing, the coil 34 is, in effect, a friction ratchet to prevent overrunning of the shaft 27, or "gag" by its frictional contact with the wall of the recess 28. In a like manner, the coil 40 operates to prevent backward running of said shaft 27 by its friction on the shaft. Coil 35, on the other hand, is employed alternately as a friction clutch and as a friction brake, said coil serving as a brake by its friction with the interior wall of the recess 28 when the coil is disengaged from the latch 37, as set forth in detail hereinafter.

The operation of the above described mechanism is as follows:—

The two heads 5 and 6 are rotated in unison by the gears 9, 9', said gears being set to bring a knife of the upper head in coöperative relation with a knife of the lower head at each half revolution of the heads. Whenever a knife of the upper head is at the limit of its outward radial movement at the time it passes a knife of the lower head, the bar of metal passing between the heads becomes severed. If the knife of the upper head is in its retracted position when it passes a knife of the lower head, no cutting is effected. The radial position of the knives of the upper head is determined by the position of the eccentric portions 26 of the shaft 27 relatively to the axis of the head 5.

Normally the shaft 27 rotates with the head 5, due to the frictional engagement of the spring 35 with the wall of the recess 28, thereby locking the shaft 27 and head 5 together. At any point in the rotation of the head 5, the shaft 27 can be locked in a stationary position by the attendant rocking the lever 38, by means of its handle 38ᵃ, to bring the latch 37 into engagement with the lug 36, causing the spring 35 to become contracted on the stationary plate 30. The shaft 27 is then held stationary and the head 5 will revolve around it. If the shaft 27 be locked in a stationary position when the head 5 and shaft 27 are in the positions shown in Fig. 3, all the knives of the upper head will be extended as they pass over the top of the head, and retracted as they pass beneath the head, and consequently no cutting will take place. If the lever 38 be rocked to release the latch 37 from the lug 36 when the parts are in the position of Fig. 3, the shaft 27 will rotate with the head 5, and the upper extended knife when it passes beneath the head 5 will coöperate with a knife of the lower head 6 to sever the metal.

As long as the latch 37 and lug 36 are disengaged, the above described cutting action will continue; that is, the shear will operate once for each revolution of the head 5, cutting off strips of metal each of a length as determined by the passage of every second knife. Such a length is the shortest strip that can be cut, and it will readily be seen that the shear can be operated to cut strips of greater length, as determined by the passage of every fourth, sixth, eighth, tenth, etc., knife; the operator has merely to disengage the latch 37 from the lug 36, in the manner above described, after he has counted the passage of the desired number of knives, to cause a cut to be taken by the knife 16 then at the top of its travel. After the cut is taken, the latch 37 is moved by the operator in engagement with the lug 36 and the shear becomes inoperative until it is desired to make another cut.

It will thus be seen that I have provided a rotary shear for severing continuously advancing material, one head of which provides radially movable knives, the operation of which, at such times as may be determined by the operator, is effected, automatically, through the agency of an element, the shaft 27, which, in function, corresponds closely to the "gags" used in reciprocating shears, said element being subjected to rotation, at such times as it is desired to render a shear knife operative for cutting, and at other times being held from rotation, to permit continuous advancement of the material through the shear, without severance of the same.

The advantage of providing two knives on each head is clear, when the operation of the mechanism, as described above, is considered. Because of this provision of two knives, the latch may be released at any half revolution, so that it is possible to make a cut every one, one and one-half, two, two and one-half, etc., revolutions, as desired.

Obviously, the knives of the lower head may also be made retractive, the same as those of the upper head, and thereby the possibility of even slightly marking the material, when no cut is taken, is entirely obviated.

I claim,

1. A shearing mechanism comprising a rotating head, a radially movable knife carried by said head, a rotatable gag member to move said knife radially outward, and means for establishing and disestablishing a driving connection between said head and said member.

2. A shearing mechanism comprising a rotating head carrying a cutting knife, a second rotating head carrying a radially movable knife, a gag member to move said knife radially outward, held concentrically in said second head, and means for establishing a driving connection between said gag member and said second rotating head to maintain said radially movable knife in its operative cutting position during its coöperation with the cutting blade of said first named rotating head.

3. A shearing mechanism, comprising a pair of rotating heads carrying coöperating cutting knives, with the knives of one of said heads radially movable, a gag member held concentrically in one of said heads to force its radially movable knives outward, means for holding said gag member stationary, and means for operatively connecting said gag member with its rotating head.

4. A shearing mechanism, comprising a rotating head carrying a pair of cutting knives radially movable, a shaft journaled concentrically in said head and having reduced eccentric sections, slidable studs interposed between said eccentric sections and said movable knives, and selective means for operatively connecting said shaft and said rotating head.

5. A shearing mechanism, comprising a rotating head, a pair of radially movable knives carried by said head, a knife carrier connecting said knives, a shaft held concentrically in said head having an eccentric section operatively connected with said carrier, means for connecting said shaft with said rotating head, and means for holding said shaft stationary.

6. A shearing mechanism, comprising a rotating head, a radially movable knife carried by said head, a shaft held concentrically in said head and having an eccentric section forming a gag member, means for holding said shaft stationary, and selective means for imparting a rotary motion to said shaft.

7. In a shearing mechanism, a rotating head carrying a radially movable knife, a member rotatable therewith to hold said knife in cutting position, and means for holding said member from rotation, to render the knife inoperative.

8. In a shearing mechanism, a rotating head carrying a radially movable knife, a rotatable member coöperating therewith to control the position of said knife, and means for selectively effecting rotation or non-rotation of said member to render the knife operative or inoperative.

9. In a shearing mechanism, a rotating head carrying on diametrically opposite sides radially movable knives, a knife carrier uniting said knives for simultaneous movement, a member for controlling the radial position of said knives, means for holding said member stationary during the rotation of said head, whereby said knives are alternately moved radially in opposite directions, and means for establishing a driving connection between said controlling member and the rotating head, whereby one of said knives is maintained in operative cutting position as the head revolves.

10. In a shearing mechanism, the combination with a rotating head carrying a fixed knife, of a second rotating head carrying a radially movable knife for coöperation with the knife of the first head, and means operable selectively to fix said movable knife in operative cutting position, or to retract said movable knife therefrom, as it approaches the knife of the first head.

11. In a shearing mechanism, the combination with a rotating head carrying a pair of fixed knives, of a second rotating head carrying a pair of radially movable knives for coöperation with the knives of the first head, and means operable selectively to fix one of said movable knives in operative cutting position and to simultaneously fix the other movable knife in non-cutting position therefrom, or to render both of said movable knives inoperative.

12. In a shearing mechanism, the combination with a rotating head carrying a radially movable knife, of a rotatable gag member operable when stationary to render said knife inoperative, and adapted when rotated with said head to retain said knife in operative cutting position.

13. In a shearing mechanism, the combination with a rotating head carrying a pair of radially movable knives, of a rotatable gag member operable when stationary to render both of said knives inoperative, and adapted when rotated with said head, to retain either one of said knives in operative cutting position.

14. In a shearing mechanism, the combination with a rotating head carrying a radially movable knife, of a rotatable gag member operable when stationary to render said knife inoperative, and adapted when rotated with said head to retain said knife in operative cutting position, and means for establishing and disestablishing a driving connection between said head and said member, comprising an expansible spiral band attached to one of said members and providing an extended contacting surface for frictional engagement with the other member.

15. In a shearing mechanism, the combination with a rotating head carrying a radially movable knife, of a rotatable gag member operable when stationary to render said knife inoperative, and adapted when rotated with said head to retain said knife in operative cutting position, and means for establishing and disestablishing a driving connection between said head and said member, comprising an expansible spiral band attached at one end to one of said members and having its other end free, a fixed member inclosed by said band, and means for engaging the free end of said band to draw it tightly on said fixed member.

Dated this 17th day of August, 1916.

VICTOR E. EDWARDS.

Witnesses:
  WILLARD A. WINN,
  PAULINE HAAS.